United States Patent [19]

Berkey

[11] Patent Number: 4,684,384

[45] Date of Patent: Aug. 4, 1987

[54] CONVEYOR DEPOSITION METHOD AND APPARATUS FOR MAKING OPTICAL FIBER PREFORMS

[75] Inventor: George E. Berkey, Pine City, N.Y.

[73] Assignee: Corning Glass Works, Corning, N.Y.

[21] Appl. No.: 913,134

[22] Filed: Sep. 29, 1986

Related U.S. Application Data

[63] Continuation of Ser. No. 833,552, Feb. 27, 1986, abandoned.

[51] Int. Cl.[4] .......................................... C03B 37/027
[52] U.S. Cl. ..................................... 65/3.12; 65/11.1; 65/18.2; 427/163; 427/421
[58] Field of Search ............... 118/320, 321, 314, 315, 118/313; 65/2, 3.12, 18.2, 11.1; 427/163, 421, 424

[56] References Cited

U.S. PATENT DOCUMENTS

| | | | |
|---|---|---|---|
| 1,978,415 | 10/1934 | Collins | 118/321 X |
| 3,737,293 | 6/1973 | Maurer | 65/3.12 |
| 3,823,995 | 7/1974 | Carpenter | 65/3.12 X |
| 3,826,560 | 7/1974 | Schultz | 65/3.12 X |
| 3,884,550 | 5/1975 | Maurer et al. | 65/3.11 X |
| 3,957,474 | 5/1976 | Kobayashi et al. | 65/3.12 |
| 4,153,901 | 1/1979 | Fujiwara et al. | 65/2 |
| 4,184,621 | 4/1979 | Gliemeroth | 65/3.12 |
| 4,397,893 | 8/1983 | Bottoms | 118/321 X |
| 4,552,576 | 11/1985 | Hara et al. | 65/2 |

*Primary Examiner*—Robert L. Lindsay
*Attorney, Agent, or Firm*—W. J. Simmons, Jr.

[57] ABSTRACT

A plurality of optical waveguide preforms are simultaneously formed by depositing on a plurality of starting members layers of glass soot to build up a coating on each starting member. The soot layers are deposited by traversing a series of burners along the starting members in such a manner that a given one of the burners traverses the first starting member from a first end thereof to a second end thereof to form a layer of soot thereon. The remaining burners of the series similarly traverses the first starting member, a plurality of burners traversing the first starting member at any given time. After the first burner has traversed the first starting member it similarly traverses the second starting member. After the last of the series of burners has begun its traverse along the first starting member, the first of the series of burners completes its traverse of the second starting member and again begins traversing the first starting member immediately following the last of the series of burners.

29 Claims, 15 Drawing Figures

CONVEYOR DEPOSITION METHOD AND APPARATUS FOR MAKING OPTICAL FIBER PREFORMS

This is a continuation of application Ser. No. 833,552, filed Feb. 27, 1986, now abandoned.

BACKGROUND OF THE INVENTION

The present invention relates to the manufacture of optical waveguide fibers.

Optical waveguide fibers have been greatly improved during the last decade. Fibers exhibiting very low losses are generally formed by chemical vapor deposition (CVD) techniques which result in the formation of extremely pure materials.

In accordance with one embodiment of the CVD technique, often referred to as the inside vapor phase oxidation process, the reactant vapor and an oxidizing medium, flow together through a hollow substrate tube where they react to form glass layers. The resultant preform is collapsed and drawn into a fiber.

In another embodiment of the CVD process, the vapor of reactant compounds is introduced into a flame, a laser beam or the like where it is oxidized to form a glass particulate material or soot which is directed toward a mandrel. This so-called flame hydrolysis or outside vapor phase oxidation method of forming coatings of glass soot is described in greater detail in U.S. Pat. Nos. 3,737,292; 3,823,995; 3,884,550; 3,957,474 and 4,135,901. To form a step-index optical waveguide fiber a first soot coating is applied to the mandrel, and thereafter, a second soot coating having a lower refractive index than the first is applied over the outside peripheral surface of the first coating. To form a gradient index fiber, a plurality of layers of glass soot are applied to the mandrel, each layer having a progressively lower index of refraction as taught in U.S. Pat. No. 3,823,995. Gradient index fibers may also be provided with a coating of cladding material. After the plurality of coatings are formed on the mandrel, the mandrel is generally removed, and the resultant tubular porous preform is gradually inserted into a consolidation furnace, the temperature of which is sufficiently high to fuse the particles of glass soot and thereby consolidate the soot preform into a dense glass body in which no particle boundaries exist. In one embodiment of the outside vapor phase oxidation process, which is described in U.S. Pat. Nos. 3,957,474 and 4,486,212, the starting rod forms the core of the resultant fiber. The deposited cladding soot is consolidated on the surface of the core rod. The resultant consolidated preform is drawn into an optical waveguide fiber.

Although CVD techniques for forming optical waveguide preforms result in the formation of optical waveguide fibers having extremely low attenuation, they are relatively expensive. Fiber manufacturing cost can be lowered by increasing preform size and by increasing deposition rate.

The size of preform which can be formed by the inside vapor phase oxidation process is relatively limited. The length of the hollow cylindrical substrate tube is limited to that length which can be supported between two separated chucks while being heated to reaction temperature. The substrate tube diameter is also limited in that process.

The outside vapor phase oxidation technique readily lends itself to cost reduction modifications. Initially, preforms were made larger by increasing the diameter. This was accomplished by traversing the burner longitudinally back-and-forth along the soot preform more times and adding thereto additional layers of increasing radius. Preform length was increased by supporting the preform vertically during deposition to prevent the longer length preform from sagging. Also, a plurality of burners were used to simultaneously deposit soot on a preform. Two burners positioned side-by-side have been moved in unison to simultaneously deposit soot on a preform. When the pair of burners stops traversing as the first burner reaches the end of the preform, the second burner is short of the preform end by the burner-to-burner spacing. The resultant "end effect" necessitates the discarding of the portion of the preform that has been formed by only one of the burners. If the two burners independently traverse the preform and each of them stops traversing the preform at the end thereof, the paths of the burners can cross. Under certain circumstances, the resultant interference can cause solid or gaseous inclusions and composition control problems. If many burners are employed and each is traversed back and forth along only a segment of the entire preform, the soot buildup is not uniform throughout the entire length of the preform since all burners cannot provide precisely the same composition and amount of soot.

SUMMARY OF THE INVENTION

It is therefore an object of the present invention to provide a soot deposition system which is capable of providing increased deposition rates without incurring the aforementioned disadvantages of previous high rate systems.

The present invention relates to a method of forming one or more preforms from which optical fibers can be formed. At least one elongated cylindrical starting member is rotated about its axis, and a plurality of layers of glass soot are deposited thereon to build up a coating having first and second ends. The improvement of the present invention comprises depositing the layers by providing a multiplicity of soot generating means such as burners. The burners are arranged in a series, the length of which is greater than the length of the coating. The spacing betweeen the centerlines of adjacent burners is preferably between 2.5 cm and 20 cm. A portion of the series of burners extends adjacent the starting member such that soot therefrom is directed toward that portion of the length of the starting member on which the coating is located. The series of burners is traversed along the starting member. The series of burners may be arranged in a complete loop, in which case the burners preferably continuously move in a predetermined direction. This mode of operation necessitates the use of a rotary union to connect the reactant gases and vapors from their respective sources to each of the burners. The rotary union is not needed if the burners alternately traverse the starting member in a first direction, stop, and traverse in the opposite direction. In this latter mentioned mode of operation, it is preferred that each time that the series of burners stops to change direction of traverse, it stops at a point along the coating that is different from the point at which it had stopped during the previous change of direction. In that mode of operation wherein the series of burners does not form a complete loop, it is necessary to continuously change the direction of traverse.

As the burners traverse the starting members the feed lines connected to the burners may tend to become twisted. This twisting action can be minimized by permitting or causing the burners to rotate about their axes, thereby relieving the aforementioned problem.

When two or more starting members are employed, the series of burners traverses each of them. Two starting members may be situated in parallel, whereas three or more may lie along the sides of a polygon.

As the diameter of the preform increases due to the deposition of soot thereon, the distance between the burners and the preform tends to decrease. The preform diameter can be determined by optical means or by continually weighing it. The soot preform is moved away from the burners as its radius increases. The burner-to-preform distance can be maintained substantially constant, or it can be varied as desired.

It is contemplated that a burner may traverse a starting member without depositing soot thereon. In a situation where the flames from all of the burners would subject a preform to an inordinately high temperature, less than all of the burners traversing that preform could be operative. For example, valves within every second burner or its supply lines could be turned off. Thus, only the remaining burners would generate soot and the concomitant heat. Some fraction or all of the burners traversing a preform could be pivoted so that their soot streams are directed to the side of a preform rather than toward the axis thereof.

DESCRIPTION OF THE PREFERRED EMBODIMENT

Figure 1:
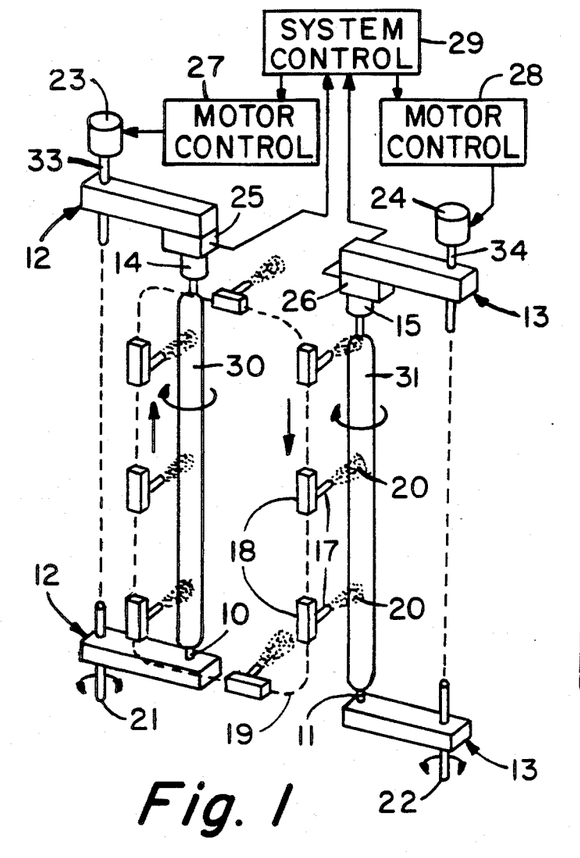
FIG. 1 is an oblique view which schematically illustrates the operation of the deposition system of the present invention.

The present invention is schematically illustrated in FIG. 1. Mandrels or starting members 10 and 11 are rotatably supported by mandrel pivoting apparatus 12 and 13, respectively. Mandrels 10 and 11 are rotated by motors 14 and 15, respectively. Each of a plurality of burners 17 is mounted on a carriage 18 which is part of a conveyor system that causes the carriages to traverse a generally rectangular path represented by dashed line 19. Burners 17 can be any suitable apparatus for generating streams 20 of glass soot or particles. For example, see FIG. 7 of my U.S. Pat. No. 4,486,212.

Mandrel pivoting apparatus 12 and 13 can be rotated in either direction about shafts 21 and 33, respectively and shafts 22 and 34, respectively, by stepping motors 23 and 24. Mandrels 10 and 11 are suspended from scales 25 and 26, the outputs of which are connected to system control circuit 29. Circuit 29 controls motors 23 and 24 via motor control circuits 27 and 28, respectively. Shafts 21 and 33 and shafts 22 and 34 are connected by dashed lines which indicate that these shafts are interconnected by additional shafts and gears to be described below.

Figure 2:
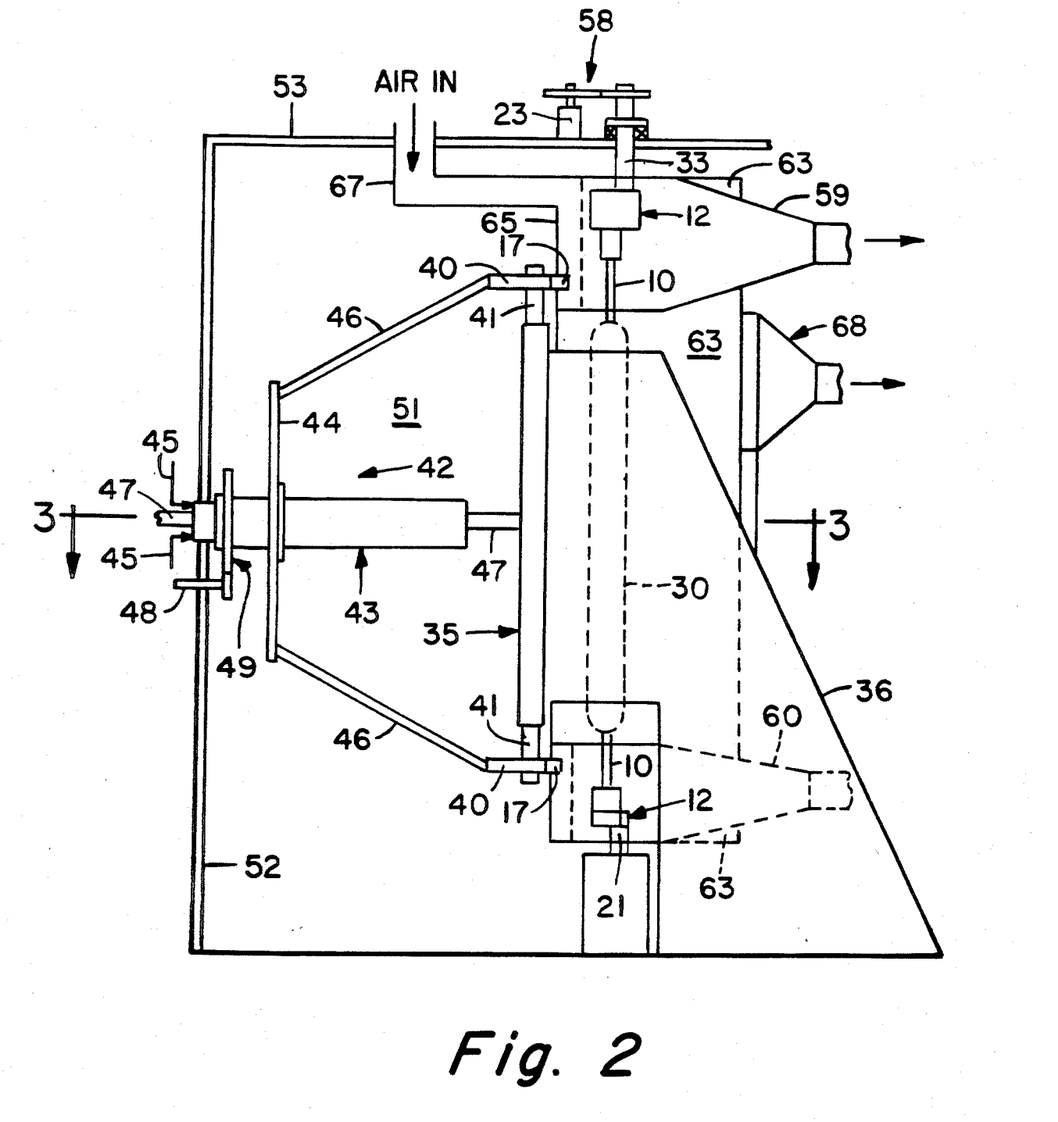
FIG. 2 is a cross-sectional view schematically illustrating the system of the present invention.
Figure 3:
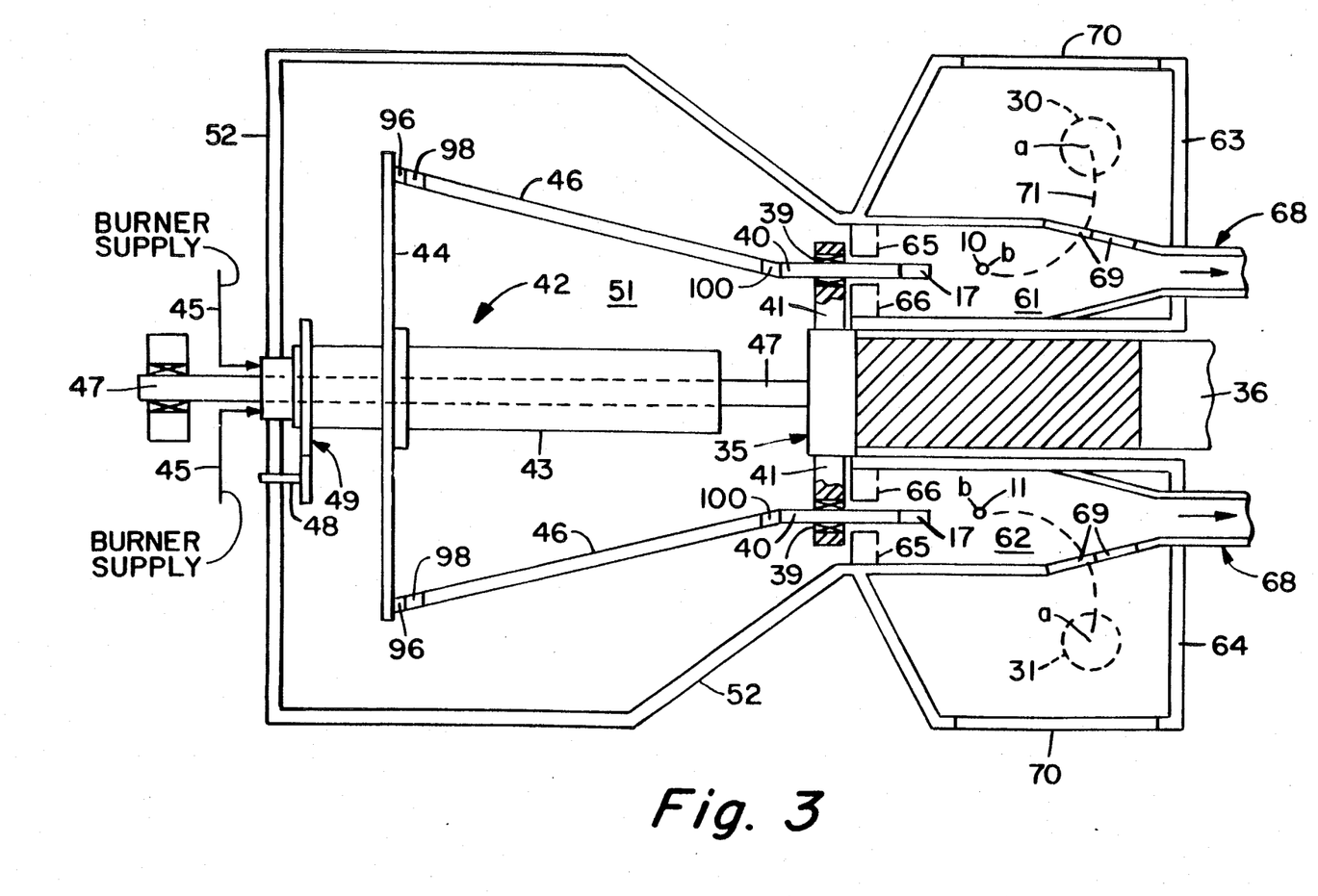
FIG. 3 is a schematic cross-sectional view taken along lines 3—3 of FIG. 2.

The burner traversing apparatus, feed apparatus and exhaust apparatus are schematically illustrated in FIGS. 2 and 3. Burner conveying system 35 is supported by a cantilevered support 36. The location of preform 30 and mandrel 10 are illustrated by dashed lines in FIG. 2. Each burner 17 is mounted at the end of a feed tube 40 which is rotatably mounted on a support arm 41.

In the embodiment wherein the burners continually rotate around conveying system 35, they must be fed through a rotary union 42. The rotary union consists of a cylindrical assembly 43 of rotating sleeves and a distribution disk 44. Gases, vapors and the like to be supplied to the burners are coupled to stationary inputs 45 of the rotary union. Examples of reactant vapor generators are disclosed in U.S. Pat. Nos. 4,230,744, 4,314,837 and 4,529,427. Extending from distribution disk 44 to burner feed tubes 40 are a plurality of cables 46, each of which comprises a sufficient number of hoses to supply each burner with the necessary gases and reactants. For the sake of simplicity only the outer two cables 46 are illustrated in FIGS. 2 and 3. Separate hoses might be required for the reactant vapor, inner shield gas, outer shield gas and gas-oxygen mixture, for example. Two additional hoses would be required if the burner is to be supplied with cooling liquid. Additional reactant vapors may also require additional hoses. As shown in greater detail in FIGS. 7, 8 and 9, a gas, liquid or vapor for the burners is supplied to inputs 45 of rotary union 42, and those inputs are distributed to cables 46, the hoses of which are connected via feed tubes 40 to each of the burners. Referring again to FIGS. 2 and 3, a shaft 47, which passes through the center of the rotary union, drives burner conveying system 35. Shaft 48 drives cylindrical assembly 43 and disk 44 via gear system 49. The drives are such that burners 17 revolve at the same rate as disk 44.

Some reactants which are to be delivered to burners 17 must be maintained at a minimum temperature to prevent condensation within the lines. Instead of heating one or more of the delivery lines within each of the cables 46, rotary union 42 and cables 46 may be situated in a heated enclosure 51 comprising vertical walls 52 and ceiling 53. The temperature within enclosure 51 is maintained at some elevated temperature such as, for example, 200° C. One or more doors (not shown) in wall 52 can provide access to the contents of enclosure 51.

Top and bottom portions of mandrel pivoting apparatus 12 are illustrated in FIG. 2. This apparatus will be discussed in greated detail below. Shafts 33 and 21 of apparatus 12 are vertically aligned and extend through the top and bottom, respectively, of cabinet 63. Shaft 33 is connected to motor 23 by gear system 58. Shaft 21 is connected by a gear system (not shown) to a vertical shaft (not shown) the upper end of which is driven by gear system 58. This connection is represented by dashed lines in FIG. 1.

During the soot deposition process, mandrels 10 and 11 are positioned within deposition chambers 61 and 62, respectively, which are located within cabinets 63 and 64, respectively. Burners 17 and a portion of their associated feed tubes 40 extend through the space between air supply ducts 65 and 66. Air input duct 67 (see FIG. 2) supplies air to duct 65. Since the burners must cross from one preform to the other above and below deposition chambers 61 and 62, the air input ducts for supply ducts 66, which are not shown, are located on that side of supply ducts 66 toward support 36. The deposition chambers are exhausted through exhaust means 68. Although only a single exhaust means 68 is illustrated in FIG. 2, a plurality thereof may extend from the top to the bottom of cabinet 63.

Chambers 61 and 62 are provided with doors 69 (see FIG. 3) through which a mandrel or finished preform may pass. To load a mandrel into the system, doors 69 are opened by an automatic mechanism (not shown), and mandrel pivoting apparatus 12 rotates to outer position a. Cabinet door 70 is opened and a mandrel is inserted therethrough and mounted in apparatus 12. The mandrel is rotated through open doors 69 where it stops at position b which is aligned with the axes of burners 17 as they traverse the mandrel.

As the preform diameter increases, the distance between the preform surface and the burner tends to decrease. If no compensation were made for such an occurrence, preform density and deposition rate could be adversely affected. As the weight of the preform increases, the respective mandrel pivoting apparatus continually moves the mandrel away from burners 17, thus maintaining the desired burner-preform distance. This is accomplished by the transmission of a signal from scale 25, for example, to system control 29 which then sends an appropriate signal to motor control 27 (see FIG. 1).

When the mandrel and deposited preform reach a predetermined weight, a signal from the scale to controller 29 causes doors 69 of FIG. 3 to open and the mandrel to be pivoted through the doors to position a. Doors 69 again close while the burners continue to emit soot streams in order to complete the deposition of the remaining preform. Doors 69 remain closed after the finished preform has been removed from the deposition chamber to properly exhaust the soot being delivered to the chamber and to prevent disturbance in the remaining chamber where the preform continues to be formed. As burners 17 leave one mandrel and pass horizontally toward the other, the soot streams therefrom flow into horizontally-disposed exhaust systems 59 and 60.

Figure 4:
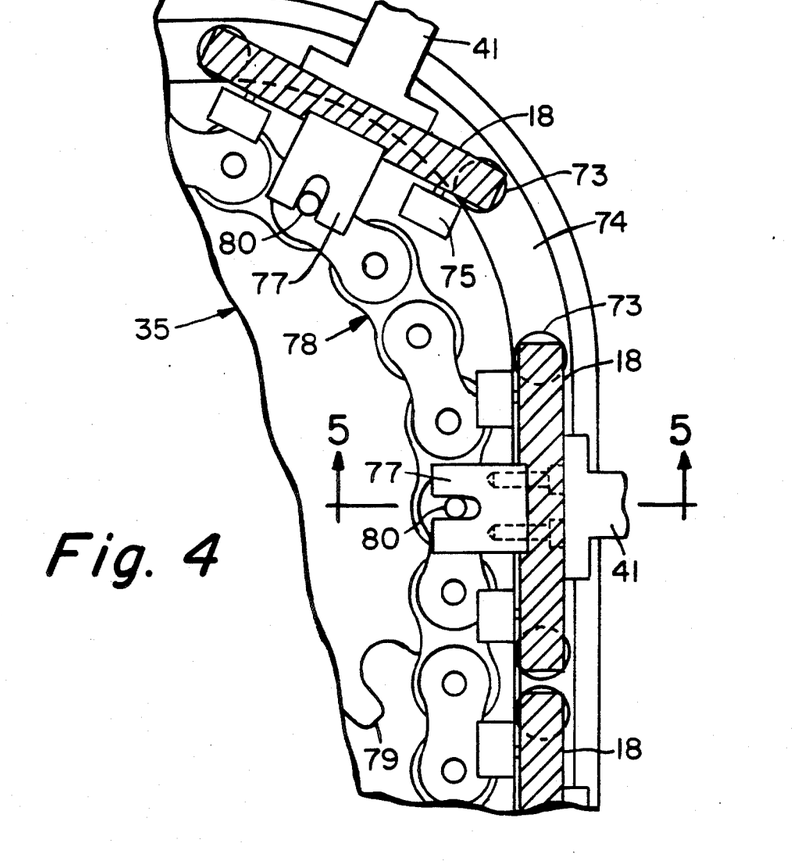
FIG. 4 is a partial cross-sectional view of a portion of the burner conveying system of FIGS. 2 and 3.
Figure 5:
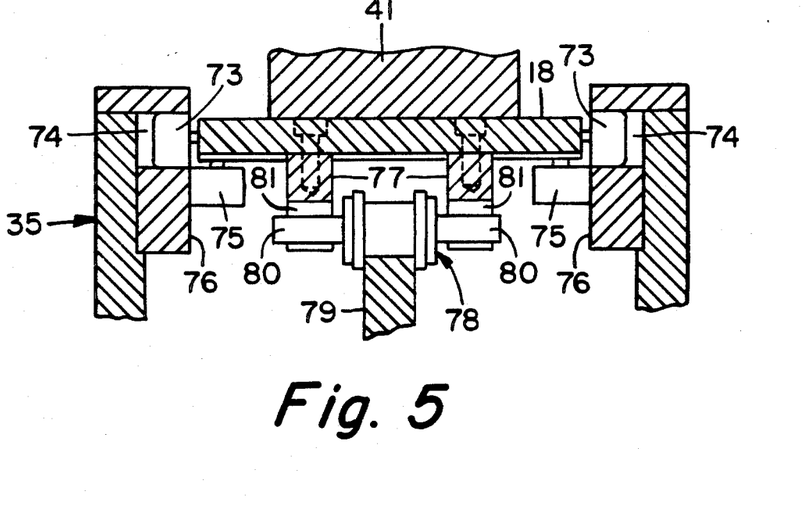
FIG. 5 is a cross-sectional view taken along lines 5—5 of FIG. 4.

Burner conveying system 35 is shown in greater detail in FIGS. 4 and 5. The burner conveying system is a modification of a commercially available system manufactured by Swanson-Erie Corporation, Erie, Pennsylvania 16512. Burner carriages 18 each have four wheels 73, two of which ride in each of the tracks 74. The carriages are also provided with four wheels 75, two of which ride against each of the guide surfaces 76. Two-slotted members 77 are fixed to the bottom of each carriage. An endless chain 78 extends around four sprockets 79, at least one of which is driven. A rod 80 extends through selected links of chain 78 which are to be employed for driving the carriages. Rods 80 extend into slots 81 in members 77. Burners support arms 41 are mounted on that side of carriages 18 opposite members 77.

The above-described burner conveying system securely maintains the proper orientation of carriages 18 as they traverse tracks 74. Therefore, the axes of those burners 17 which are traversing mandrels 10 and 11 are continually maintained substantially perpendicular to the axes of those mandrels.

Figure 6:
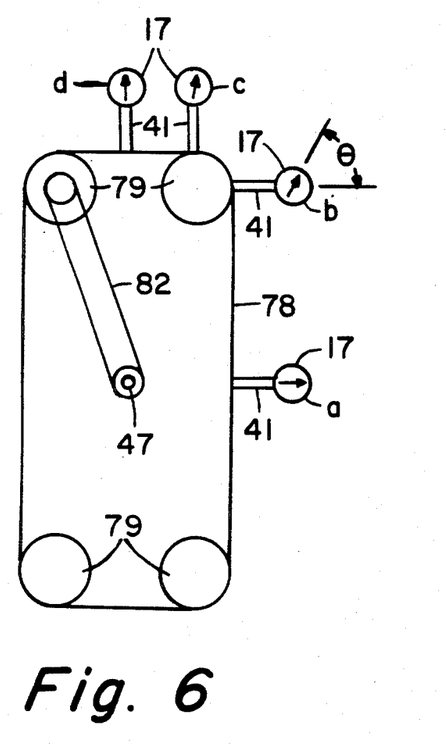
FIG. 6 is a schematic illustration of the burner conveying system.

FIG. 6 is a schematic illustration of the burner conveying system. Chain 78 extends around four sprockets 79. A chain drive 82 connects shaft 47 to one of the sprockets 79.

Burners 17 are illustrated in positions a, b, c and d. An arrow shown at each burner position represents the orientation of that end of the burner feed cable 46 at distribution disk 44 (see FIGS. 2 and 3). As the burner moves from position a to position b, its orientation with respect to the horizontal remains unchanged. However, as distribution disk 44 rotates, the orientation of the particular cable 46 connected to that burner rotates through an angle $\theta$. This causes a twisting of cable 46 and thus of the distribution lines therein, thereby accelerating the wear of the hoses thereof. Burner feed tubes 40 are therefore rotatably mounted in bearings 39. The amount of twisting to which cables 46 are subjected is minimized due to the rotation of burner feed tubes 40. As a burner reaches a sprocket 79 and begins to travel between positions b and c, the angular rotation of the burner with respect to the horizontal quickly changes by 90°. Again, feed tube 40 rotates to minimize cable twisting.

Each of the cables 46 could further comprise a centrally located stranded steel wire to minimize the amount of twisting to which the cables are subjected.

Figure 7:
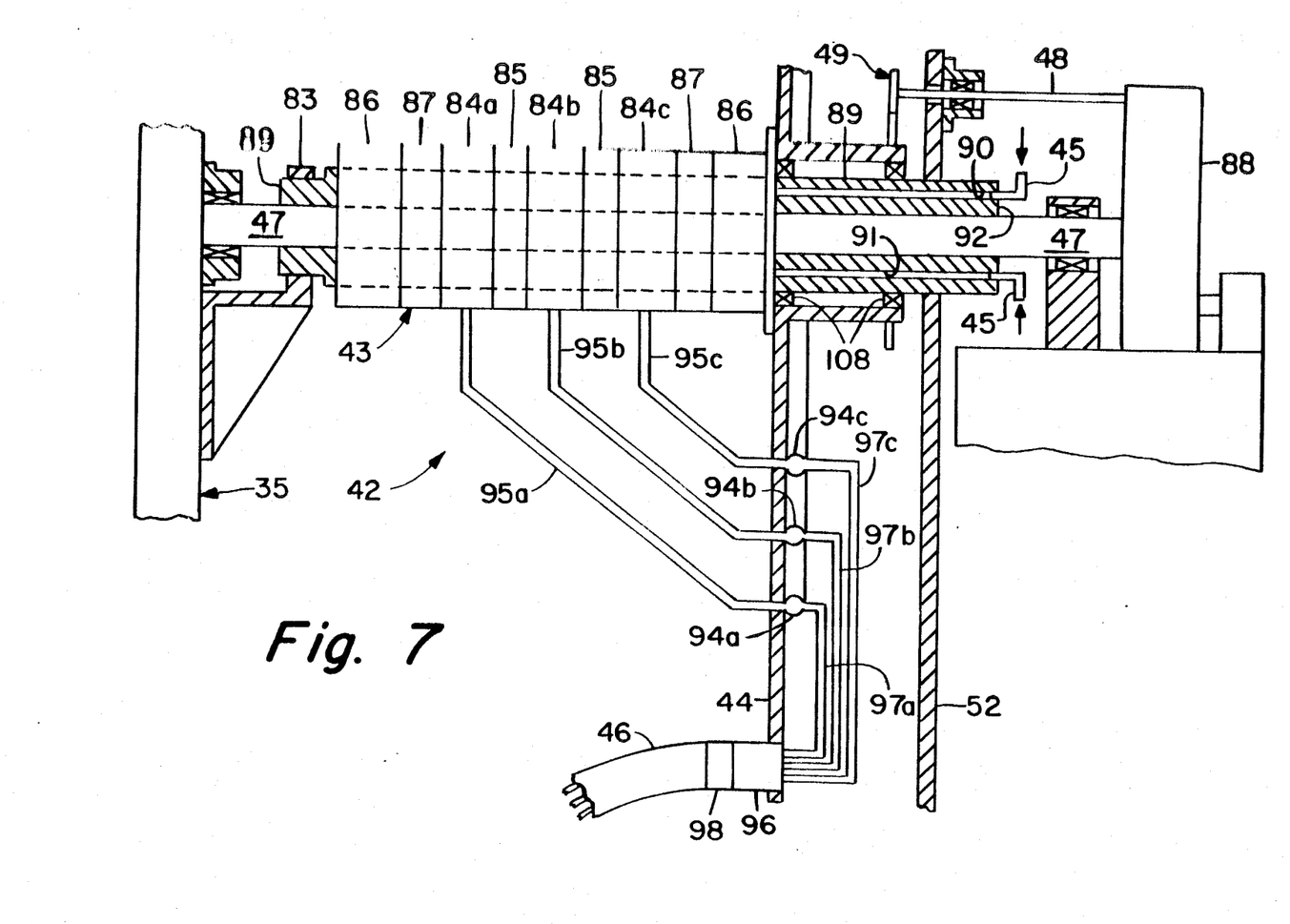
FIG. 7 is a partial cross-sectional view of the rotary union employed in FIGS. 2 and 3.
Figure 8:
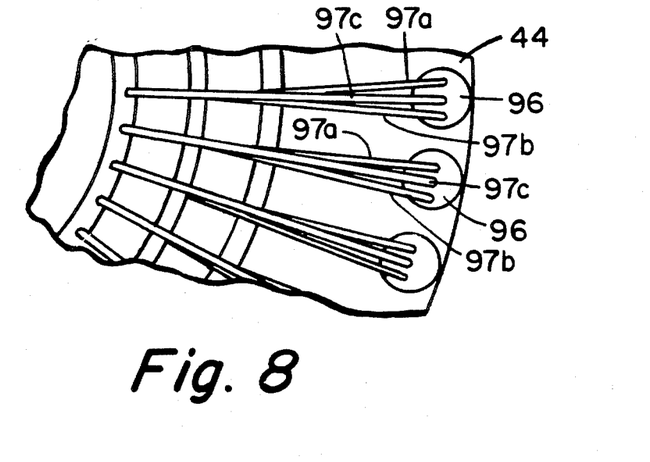
FIG. 8 illustrates a portion of rotary union disc 44.
Figure 9:
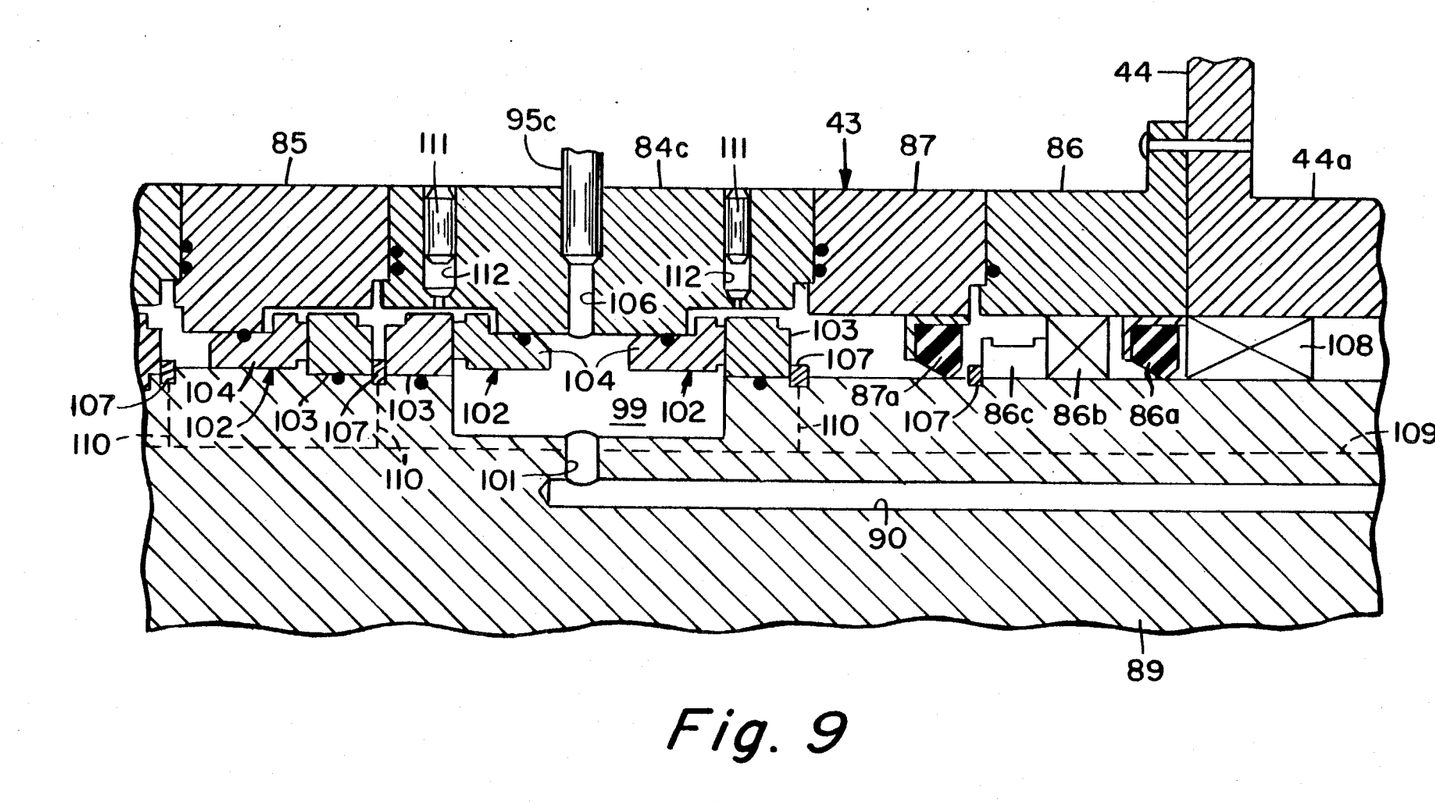
FIG. 9 is a partial cross-sectional view of the rotary union cylinder.

Rotary union 42 is shown in greater detail in FIGS. 7-9. The rotary union is a modification of a commercially available device manufactured by Scott Engineering Co., 430 N. Ninth St., Olean, New York 14760. Cylindrical assembly 43 comprises a plurality of rotatable distribution sleeves 84a, 84b and 84c which are separated by annular sealing segments 85. The total number of sleeves 84 is determined by the number of reactants, gases and liquids that are to be supplied to the burners. Only three segments are shown in FIG. 7 for the sake of simplicity. An end cap 86 at each end of assembly 43 is separated from the nearest sleeve 84 by a lip seal retainer 87. Because of the amount of detail within cylindrical assembly 43, only the external view thereof is shown in FIG. 7, a cross-sectional view of a portion thereof appearing in FIG. 9. A plurality of equally-spaced bolts (not shown) extends longitudinally through the components of assembly 43 to secure it together as a unitary structure. Shaft 47 extends from gear box 88 through the longitudinal axis of the rotary union to burner conveying system 35. Stationary cylinder 89 extends through the entire length of cylindrical assembly 43. End 92 of cylinder 89 protrudes through vertical wall 52. The opposite end is secured by clamp 83. A plurality of bores including bores 90 and 91 extend from end 92 of cylinder 89 to various of the sleeves 84. For example, bore 90 might extend to sleeve 84c, and bore 91 might extend to sleeve 84b. A plurality of annular, concentric manifold pipes 94a, 94b and 94c are affixed to disk 44. Sleeves 84a, 84b and 84c are connected to manifold pipes 94a, 94b and 94b by interconnection pipes 95a, 95b and 95c, respectively. Four such interconnection pipes 95a, 95b, etc. might be employed to connect each sleeve to its respective manifold pipe. As shown in FIG. 8, fittings 96 are equally distributed around the circumference of disk 44. Each fitting 96 has a plurality of bores equal in number to the number of sleeves 84a, 84b, etc. One of a plurality of pipes 97a connects one of the bores in one of the fittings 96 to manifold pipe 94a. Similarly, one of the pipes 97b and one of the pipes 97c connect the remaining bores of that fitting 96 to manifolds 94b and 94c, respectively. Each cable 46 is terminated with a quick disconnect fitting 98 which plugs into fitting 96 (see FIG. 7). Thus, each of the feed lines within cable 46 is connected by fittings 96 and 98, a line 97, manifold 94 and a line 95 to one of the sleeves 84. Quick disconnect fittings 100 also connect the remaining ends of cables 46 to feed tubes 40 as shown in FIG. 3.

FIG. 9 shows one end of cylindrical assembly 43. Disposed within cylinder 89 adjacent to sleeve 84c is an annular cavity 99 which is connected to bore 90 by one or more bores 101. Balanced seals 102 are situated between the rotating parts and cylinder 89. Each of these seals consists of a stainless steel ring 103 and a teflon ring 104. Elastic static seals, which are represented by black circles, are appropriately positioned between various parts. Bore 106 in sleeve 84c has an enlarged outer portion into which interconnection pipe 95c is inserted. A grease seal 86a, a bearing 86b and a bearing preload 86c are located within endcap 86. A second grease seal 87a is affixed to retainer 87. Snap rings 107 correctly position various of the components longitudinally along cylinder 89. Bearings 108 are located within hub 44a of disc 44.

During the operation of the rotary union, elements 44, 84, 85, 86, 87 and 104 rotate relative to stationary cylinder 89 and segments 103 of the balanced seal. A gas, vapor or liquid supplied to bore 90 is fed to cavity 99 from which it exits through bore 106 and pipe 95c. Some of the material supplied to cavity 99 can leak past the static seals and thus escape from the rotay union to the atmosphere. This cannot be tolerated for certain materials such as silicon tetrichloride which constitutes a danger to personnel and equipment. The leakage paths adjacent cavity 99 can be pressurized with an inert gas which leaks back into cavity 99, thereby preventing the leakage of the supplied material from cavity 99 to the atmosphere. Dashed line 109 represents a bore that extends longitudinally through cylinder 89. Bore 109 is illustrated in dashed line form to indicate that it is located at an aszimuthal position which is different from bore 90. A bore 110 extends from bore 109 to each of the slots in which snap rings 107 are disposed. Inert gas is supplied to bore 109 at a pressure that is much greater than the supply pressure of the material fed to cavity 99. Needle valves 111 situated in bores 112 reduce the pressure of the inert gas in those slots just outside cavity 99 to a value that is sufficiently low that only a minute amount of the inert gas leaks from those slots into cavity 99.

Figure 10:
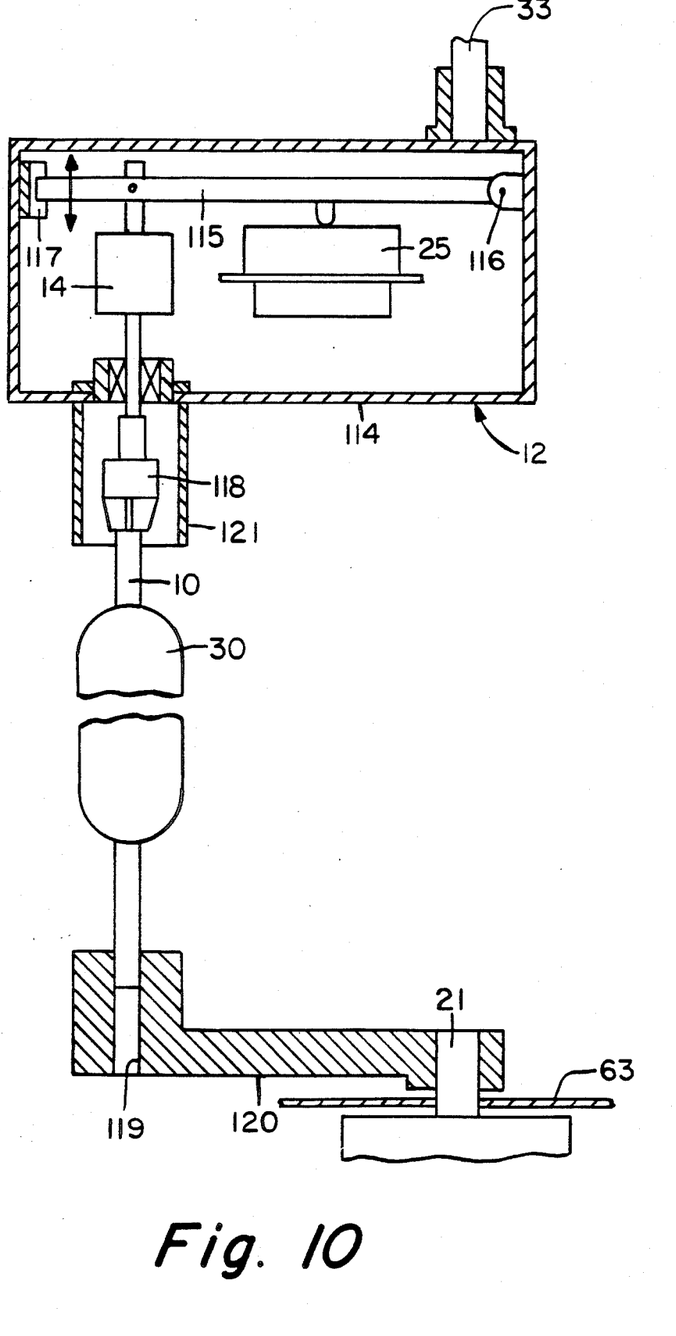
FIG. 10 is a cross-sectional view of the mandrel pivoting apparatus.

Mandrel pivoting apparatus 12 is shown in greater detail in FIG. 10. The top and bottom portions of apparatus 12 pivot around shafts 33 and 21, respectively. As stated above, shafts 21 and 33 are coupled together so that they rotate in unison. Located in housing 114 is a lever arm 115 which pivots around axis 116. The end of of arm 115 opposite axis 116 is confined to vertical movement by a U-shaped guide 117. Suspended from arm 115 is motor 14, the shaft of which extends through housing 114 and terminates in a chuck 118. A mandrel 10 is inserted into apparatus 12 by placing the lower end thereof into bore 119 of support arm 120, and then the upper end of mandrel 10 is connected to chuck 118.

Shield 121 prevents soot from building up on the chuck. The weight of preform 30 is determined by subtracting from the total weight measured by scale 25 at any given time the tare weight which was determined prior to the deposition of soot on mandrel 10.

In one mode of operation, mandrels 10 and 11 are fire-polished before any soot is deposited thereon. Referring to FIGS. 1 and 3, doors 70 are opened, and mandrels 10 and 11 are loaded into pivoting apparatus 12 and 13 at position a. With doors 69 and 70 closed, burners 17 are ignited and are traversed around path 19 for a period of time sufficient to permit the flames to stabilize. This may require a period of time between about 1 and 30 minutes. Doors 69 open, and mandrel pivoting apparatus 12 and 13 are then rotated into the positions illustrated in FIG. 1. This corresponds to position b of FIG. 3. After doors 69 close, mandrels 10 and 11 are flame-polished by the traversing burners. System control circuit 29 then generates the necessary control signals to cause doors 69 to open and apparatus 12 and 13 to again rotate the mandrels to position a. After doors 69 close, the flow of reactants to the burners is initiated, and streams 20 are generated. Another stabilization period of between 1 and 30 minutes is required for the streams to reach equilibrium. During this stabilization period, the soot is directed into exhaust system 68. Doors 69 open and pivoting apparatus 12 and 13 are again rotated to position b. Doors 69 close and the burners traverse longitudinally along mandrel 10 where streams 20 build up soot preform 30. After reaching the end of preform 30, the burners advance to one end of mandrel 11 which they traverse to build up soot preform 31. As described above, the axes of mandrels 10 and 11 move along arcuate path 71 as the preform diameter increases to change the distance between the burner and preform as necessary. It may be desirable, for example, to maintain a constant burner-preform distance. If however, more heat were needed at some preform radius, the burner-preform distance could be reduced.

It is advantageous to employ some means for determining when a preform has reached full size. In FIG. 1, the preforms are continually weighed by scales 25 and 26. Assume that preform 30 is first to reach a predetermined finished weight. A signal from scale 25 to circuit 29 causes activation of motor 23 which in turn rotates preform 30 to position a (see FIG. 3) where it is out of the path of soot streams 20. All of the burners 17 continue to produce soot streams. Since preform 30 has been removed from chamber 61 and doors 69 have been closed, all of the soot that is directed into chamber 61 is merely exhausted. However, soot streams 20 continue to deposit on preform 31 which remains in chamber 62. When preform 31 reaches its predetermined finished weight, it is similarly rotated through doors 69 and out of the path of soot streams 20. After the last preform has been removed from the path of the soot streams, the burners are turned off.

Preliminary experiments indicate that the optimal center-to-center spacing between adjacent burners is about 6.4 cm–7.6 cm for the burners referred to above. As the spacing decreases below about 2.5 cm, there is too much interaction between adjacent burners and deposition rate declines seriously. Spacings greater than about 20 cm will appreciably decrease deposition rates. These spacings may change for burners that produce more or less heat than the burners of the aforementioned experiments.

Figure 11:
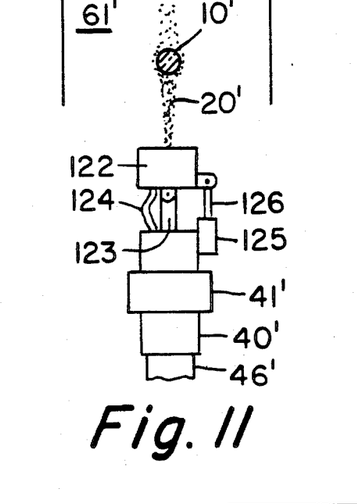
FIGS. 11 and 12 illustrate a modified burner mount which can be employed in the present system.
Figure 12:
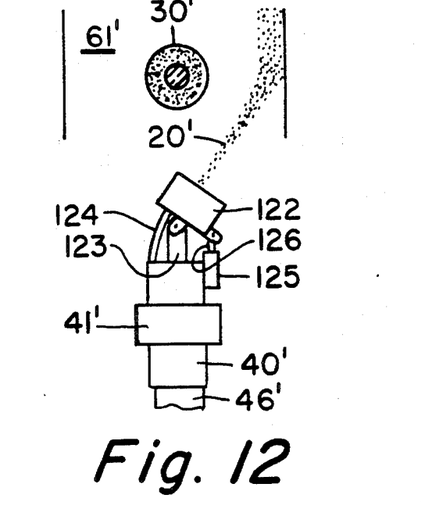

The apparatus of FIGS. 11 and 12 permits the burner axis to be rotated so that it does not intersect the axis of the mandrel when the mandrel is in its deposition position. In these figures, apparatus similar to that described in conjunction with FIGS. 1-10 is represented by primed reference numerals. Burner 122 is pivotally connected to support bracket 123 which extends from an end of feed tube 40'. The various reactants and gases are supplied to burner 122 through flexible hoses 124. A solenoid 125 is mounted on feed tube 40'. The movable arm of the solenoid is pivotally connected to burner 122. Electrical wiring for the solenoid can be fed through cable 46' to a conventional slip ring assembly (not shown) located at the rotary union.

To flame polish mandrel 10' or to deposit soot thereon, solenoid 125 remains unactivated so that a spring located therein forces arm 126 outwardly as shown in FIG. 11.

To prevent the burner flame or soot stream from impinging upon the mandrel or upon the preform deposited thereon, solenoid 125 is energized, thereby retracting solenoid arm 126. Burner 122 is thus rotated so that its axis does not coincide with that of the mandrel. As shown in FIG. 12, if burner 122 had been depositing soot on preform 30', soot stream 20' flows past the preform into the exhaust system. If preform 30' reached finished weight prior to the time that the other preform does, solenoid 125 remains unactivated while the burners traverse the other preform, the solenoid becoming activated before the burners reach preform 30'. As soon as the other preform also reaches full weight, the solenoid remains activated until the burners are turned off.

Figure 13:
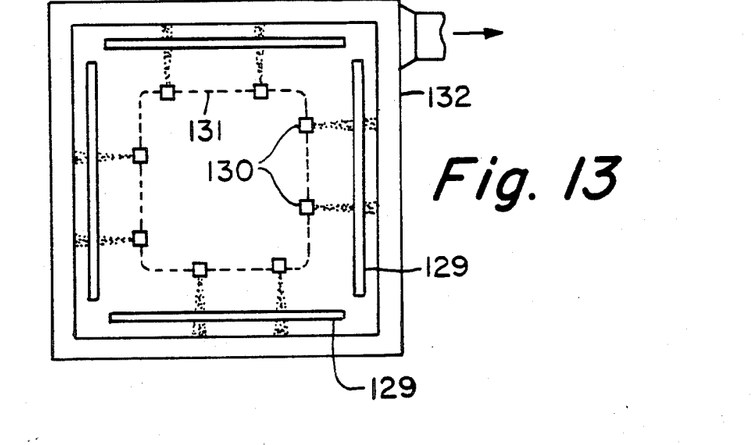
FIG. 13 is a schematic illustration of a modified deposition system.

Whereas the mandrels are oriented vertically in FIGS. 1-10, other orientations are obviously possible. For example, two mandrels could be horizontally disposed. If only two mandrels are employed, it is preferred that they be supported in parallel, but other orientations are possible. If three or more mandrels are employed, they might lie along the sides of a polygon or they may be disposed in any other desired arrangement. For example, four mandrels 129 could be arranged as shown in FIG. 13. Burners 130 could traverse a track 131 that is located within the polygon of mandrels 129. Excess soot could be collected by exhaust system 132. The burner track could alternatively be located outside or beneath the polygon on which the mandrels are located with the exhaust system on the inside or above the mandrels. The illustrated symmetrical and equiangular arrangements are not a necessity.

It is thought that preform diameter could also be measured by an optical system such as that disclosed in U.S. Pat. No. 4,062,665. However, the preform weighing system disclosed herein has the advantage of remaining relatively unaffected by contamination due to soot in the deposition chamber.

Figure 14:
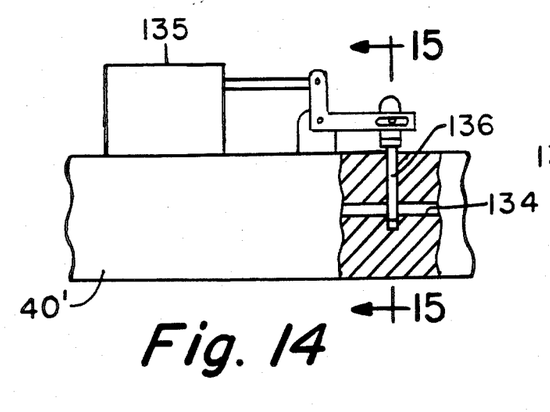
FIG. 14 is a partial cross-sectional view of a valve system for quenching flow to a burner.
Figure 15:
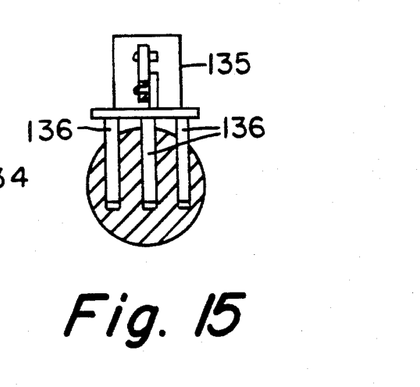
FIG. 15 is a cross-sectional view taken along lines 15—15 of FIG. 14.

It may be advantageous during certain portions of the preform formation process to employ less than all of the burners of the system. For example, a system may be designed having a given number of burners to provide an optimal rate for the deposition of pure $SiO_2$. That given number of burners might generate an excessive amount of heat for the deposition of $GeO_2$-doped $SiO_2$. Means such as that shown in FIGS. 14 and 15 can be employed for cutting off the supply of fuel and reactants to some fraction of the burners during portions of the preform formation process. Burner feed tube 40' contains a plurality of bores 134 through which the various burner gases and vapors pass. Situated on tube 40' is a solenoid 135 which is connected by a lever to valves 136. When the flow is to be cut off, solenoid 135 is actuated, whereby it assumes the condition shown in FIGS. 14 and 15. If solenoid 135 remains unactuated, a spring therein causes valves 136 to be pulled upwardly, thereby enabling the flow of gases, liquids and/or vapors through bores 134. If every other burner is generating soot and valves 136 are opened, the fuel and oxygen mixture emanating from the burners that have first been turned on will spontaneously ignite because of the heat generated by the previously fired burners. Also, one or more electrical ignitors can be located in deposition chambers 61 and 62 to light the burners.

After the preforms produced in accordance with the aforementioned methods have reached a suitable weight, they may be removed from the deposition apparatus and transported to a consolidation furnace where they are heated to a temperature sufficiently high to form a consolidated preform from which a glass optical waveguide fiber can be drawn. If the mandrel is removed from the preform prior to drawing, the entire fiber core may be formed of glass deposited by the moving burners 17. Alternatively, each of the mandrels 10 and 11 may form the central region of a preform while the glass soot deposited by burners 17 forms the outer portion thereof. The soot coating is thereafter fused onto the mandrel to form a consolidated preform from which fibers are drawn.

I claim:

1. A method of forming at least one preform comprising
   providing at least one elongated cylindrical starting member,
   rotating said at least one starting member about the axis thereof, and
   depositing a plurality of layers of glass soot on said starting member to build up a coating thereon, said coating having first and second ends,
   the improvement comprising depositing said layers by providing a plurality of soot generating means, said soot generating means being arranged in a series the length of which is greater than the length of said coating, a portion of said series of generating means extending adjacent said starting member such that soot therefrom is directed toward that portion of the length of said starting member on which said coating is located, and traversing said series of generating means along said starting member.

2. A method in accordance with claim 1 wherein the step of providing at least one starting member comprises providing a plurality of starting members.

3. A method in accordance with claim 1 wherein the step of providing a plurality of soot generating means comprises providing said soot generating means in such an arrangement that they form a complete loop.

4. A method in accordance with claim 1 wherein the step of traversing said generating means comprising continuously moving said generating means in one direction.

5. A method in accordance with claim 1 wherein the step of traversing said generating means comprises alternately traversing said generating means in one direction and then in the opposite direction.

6. A method in accordance with claim 5 wherein each time that said series of generating means stops to change direction of traverse, it stops at a point along said coating that is different from the point at which it had stopped during the previous change of direction.

7. A method in accordance with claim 1 wherein the spacings between the center lines of adjacent ones of said soot generating means is between 2.5 cm and 20 cm.

8. A method of forming a preform comprising
providing an elongated cylindrical starting member,
rotating said starting member about its axis, and
depositing a plurality of layers of glass soot on said starting member to build up a coating thereon,
the improvement comprising depositing said layers by traversing a series of soot generating means along said starting member such that a given one of said generating means traverses said starting member along a first path from a first end thereof to a second end thereof to form a layer of soot thereon, the remaining generating means of said series similarly traversing said starting member, a plurality of said generating means depositing soot on said starting member at any given time, each of said soot generating means following a second path as it traverses from said second end of said starting member to said first end thereof, such that after the last of said series of generating means has begun its traverse along said first path, the first of said series of generating means begins a subsequent traverse along said first path.

9. A method in accordance with claim 8 further comprising the steps of providing a second starting member adjacent a portion of said second path such that soot streams emanating from said soot generating means are directed toward said second starting member as said soot generating means pass thereby, whereby a coating of soot particles is built up on said second starting member.

10. A method in accordance with claim 8 wherein, during a portion of the operating cycle of said method, said soot streams are directed to the side of said starting member.

11. A method in accordance with claim 8 wherein, during at least a portion of the time that said coating is being built up, less than all of the soot generating means traversing said starting member are generating soot.

12. A method in accordance with claim 8 further comprising the step of varying the distance between said mandrel said soot generating means during the step of depositing a plurality of layers.

13. A method in accordance with claim 8 further comprising the step of moving said starting member away from said soot generating means to maintain a substantially constant distance between the surface of said coating of soot and said generating means.

14. A method in accordance with claim 8 further comprising the step of continually weighing said starting member and the soot deposited thereon and moving said starting member away from said soot generating means as the weight of said deposited soot increases.

15. A method in accordance with claim 8 wherein, during at least a portion of the traverse of said generating means along said starting members, each of said generating means rotates about its axis.

16. A method of forming a plurality of preforms comprising
providing at least two elongated, cylindrical starting members,
rotating each of said starting members about its axis, and
traversing a series of soot generating means in a predetermined direction along a first of said starting members such that a given one of said generating means traverses said first of said starting members from a first end thereof to a second end thereof while depositing soot thereon, each of said generating means forming a layer of soot thereon, the remaining generating means of said series similarly traversing the first of said starting members to build up a coating of soot thereon, each of said soot generating means, after traversing said first of said starting members, similarly traversing the remaining of said starting members while directing soot thereon to build up a coating of soot on each of the remaining of said starting members, the first of said series of generating means beginning a subsequent pass along said first of said starting members in said predetermined direction immediately after the last of said series of starting members has begun its traverse.

17. Apparatus for forming a plurality of porous glass preforms comprising
a plurality of soot generating means,
means for traversing said soot generating means around a closed loop,
means for supporting a plurality of elongated, cylindrical starting members adjacent said loop, said starting members being situated in such a manner with respect to said generating means that soot emanating from any one of said generating means is directed along the greater portion of the length of each of said starting members as that generating means traverses said closed loop, and
means for rotating said starting members.

18. Apparatus in accordance with claim 17 wherein said means for supporting comprises means for supporting two starting members in a parallel arrangement.

19. Apparatus in accordance with claim 17 wherein said means for supporting comprises means for supporting a plurality of starting members end to end so that they lie along the sides of a polygon.

20. Apparatus in accordance with claim 17 wherein said soot generating means are equally spaced around said loop.

21. Apparatus in accordance with claim 17 wherein said closed loop has a plurality of straight sections, one of said straight sections lying adjacent each of said starting members.

22. Apparatus in accordance with claim 17 further comprising means for determining the radius of each of said preforms and the means for moving each of said starting members away from said soot generating means in response to an increase in the radius of that preform.

23. Apparatus in accordance with claim 17 further comprising a plurality of sources of materials to be delivered to each of said soot generating means and means for coupling each of said sources to each of said soot generating means.

24. Apparatus in accordance with claim 23 wherein said means for connecting comprises a rotary union.

25. A method of forming at least one preform comprising
providing at least one elongated cylindrical starting member,
rotating said at least one starting member about the axis thereof, and
depositing a plurality of layers of glass soot on said starting member to build up a coating thereon, said coating having first and second ends,
the improvement comprising depositing said layers by providing a plurality of soot generating means arranged in a series which traverses a path, the length of which is greater than the length of said coating, a first portion of said path extending adjacent said starting member such that soot from those of said soot generating means that are located on said first portion of said path is directed toward that portion of the length of said starting member on which said coating is located, and transversing said series of generating means along said path.

26. A method in accordance with claim 25 wherein said path forms a complete loop.

27. A method in accordance with claim 25 wherein the step of traversing said generating means comprising continuously moving said generating means in one direction.

28. A method of forming a preform comprising providing an elongated cylindrical starting member, rotating said starting member about its axis, and depositing a plurality of layers of glass soot on said starting member to build up a coating thereon, the improvement comprising depositing said layers by transversing a series of soot generating means along said starting member such that a given one of said generating means traverses said starting member along a first path from a first end thereof to a second end thereof to form a layer of soot thereon, the remaining generating means of said series similarly traversing said starting member, each of said soot generating means following a second path as it traverses from said second end of said starting member to said first end thereof.

29. A method in accordance with claim 8 further comprising the steps of providing a second starting member adjacent a portion of said second path such that soot streams emanating from said soot generating means are directed toward said second starting member as said soot generating means pass thereby, whereby a coating of soot particles is built up on said second starting member.

* * * * *